United States Patent [19]

Lozano

[11] 4,219,064
[45] Aug. 26, 1980

[54] NON-MARRING CLIP NUT

[75] Inventor: Anthony H. Lozano, Westminster, Calif.

[73] Assignee: Shur-Lok Corporation, Irvine, Calif.

[21] Appl. No.: 918,386

[22] Filed: Jun. 23, 1978

[51] Int. Cl.² .............................................. F16B 39/00
[52] U.S. Cl. ................................................. 151/41.75
[58] Field of Search ................... 85/32 K; 151/41.74, 151/41.75, 7; 248/345.1

[56] References Cited

U.S. PATENT DOCUMENTS

| | | | |
|---|---|---|---|
| 2,258,342 | 10/1941 | Tinnerman | 151/41.75 |
| 2,274,014 | 2/1942 | Tinnerman | 151/41.75 X |
| 2,904,820 | 9/1959 | Flora | 151/41.75 X |
| 3,118,480 | 1/1964 | Kreider | 151/41.75 |
| 3,145,753 | 8/1964 | Kreider | 151/41.75 |
| 3,999,583 | 12/1976 | Nelson | 151/41.75 |
| 4,074,491 | 2/1978 | Bell et al. | 151/41.75 X |

FOREIGN PATENT DOCUMENTS

| | | | |
|---|---|---|---|
| 40199 | 7/1965 | German Democratic Rep. | 151/41.75 |
| 1494307 | 7/1967 | France | 151/41.75 |
| 868086 | 5/1961 | United Kingdom | 151/41.75 |
| 965779 | 8/1964 | United Kingdom | 151/41.75 |
| 969809 | 9/1964 | United Kingdom | 151/41.75 |

OTHER PUBLICATIONS

Section 8 of Trade Catalog of Shur-Lok Corp., "Clip Nuts," Sep. 1974, SL210 Series-SL215 Series and SL200 Data.

*Primary Examiner*—Thomas J. Holko
*Attorney, Agent, or Firm*—K. H. Boswell; Edward D. O'Brian

[57] ABSTRACT

An improved clip nut has a long flat spring steel body which is bent back upon itself such that the two end portions of the spring steel body lie essentially parallel to each other with one portion forming the top arm and other portion forming the bottom arm. The top arm has a hole through its surface and a small flange projecting off of each of the respective sides. Each of the flanges has a slot near the edge where the flange joins the top arm. The nut portion of the clip nut comprises a nut member having tabs fitting into the slots. The threaded bore of the nut is in alignment with the hole in the upper arm. The bottom arm has two fingers integrally formed with and parallel with the side edges of the arm. The end of each finger is provided with a dog. A plastic sleeve is formed of a molded structure having a channel along each respective side edge of the plastic sleeve. A hole passes through an annular boss in the sleeve. The plastic sleeve is slid onto the bottom arm with the fingers fitting into the channels in the sleeve. The sleeve is retained on the arm by the dogs on the ends of the fingers. By virtue of the plastic sleeve when the clip nut is slid onto a plate, the surface of the plate is not marred or scratched by the clip nut.

7 Claims, 6 Drawing Figures

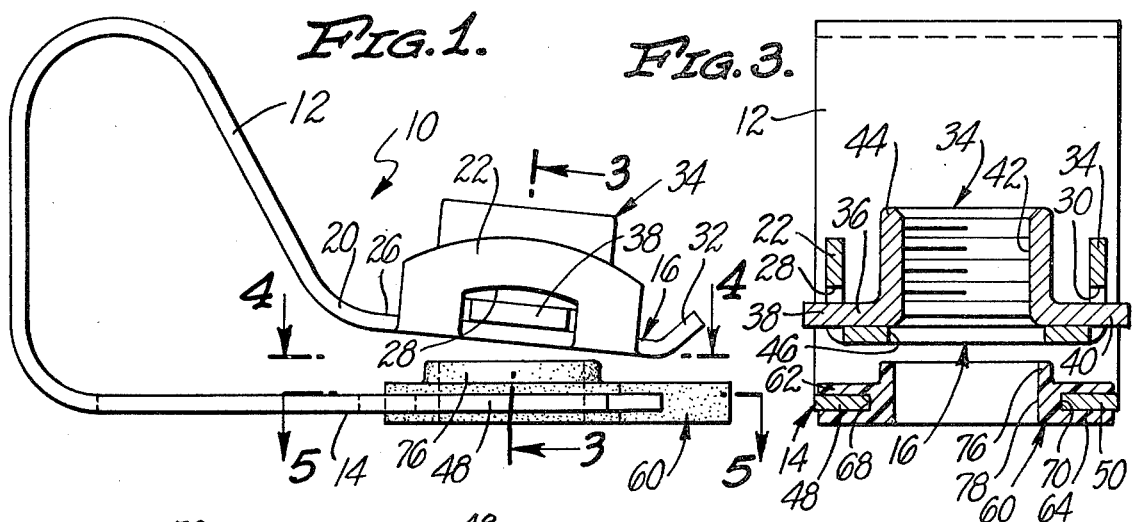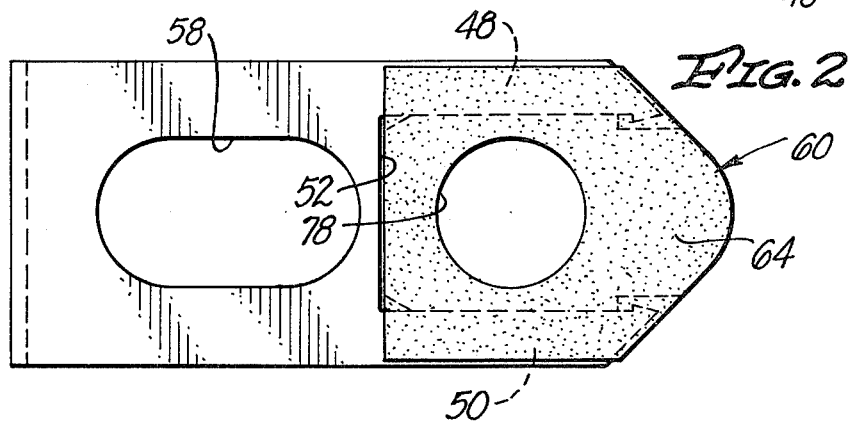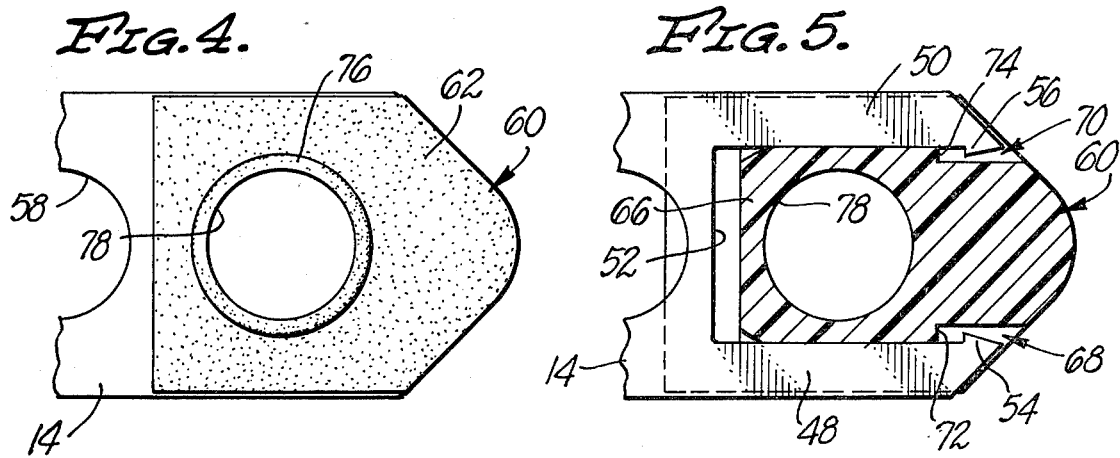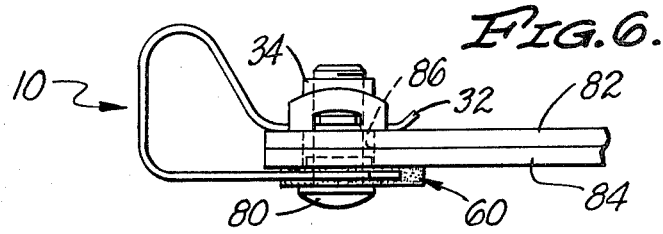

NON-MARRING CLIP NUT

BACKGROUND OF THE INVENTION

A non-marring clip nut is described which has a plastic sleeve having an upstanding annular boss on the sleeve. The plastic sleeve fits onto the lower arm of the clip nut and allows a plate to be inserted between the two arms of the clip nut without scratching or marring the surface of the plate.

Clip nuts have found a wide acceptance because they hold a nut in place behind a panel or other similar flat surface to which another panel or other flat surface is being joined. Several designs of clip nuts are known, including those described in U.S. Pat. Nos. 3,118,480 and 3,145,753. Aside from simply holding a nut, it has also been found desirable to engineer into the clip nut a means for maintaining the clip nut in exact position on a plate or surface prior to insertion of the bolt which will secure the final assembly. Thix can be done by providing on the clip nut an annular boss which will fit into a hole drilled into one of the surfaces to be attached and thus holds the clip nut in position for receiving the attaching screw or bolt.

Clip nuts are generally mass produced and manufactured to be very inexpensive. Normally if the clip nut is provided with an annular boss for holding the nut in position on a surface, this annular boss is simply punched from the surface of the clip nut. Because of this the annular boss more often than not will have burrs or irregularities in its surface and when the clip nut is slid onto a plate or other surface the irregularities or burrs will scratch the surface.

In many instances it is deemed highly disadvantageous to have the surface of the plate scratched by inserting the clip nut on the plate. If the surface of the plate has been anodized, scratches through the protective or decorative film so anodized onto the plate by the clip nut will destroy the properties of the material so coated on the plate.

BRIEF SUMMARY OF THE INVENTION

It is a broad object of this invention to provide an improved clip nut which when inserted upon a plate or other surface will not mar or abraid the surface of the plate. It is a further object to provide such a clip nut which is simple in design, and thus can be mass produced in an economical manner. Additionally, it is an object of the invention to provide a clip nut of the type having an annular boss on one arm to facilitate positioning of the clip nut and further it is an object to provide a clip nut wherein the nut portion and the component having the annular boss are both free floating to facilitate aligning of the nut, the surfaces to be connected, and the connecting bolt or screw.

In accordance with this invention these and still other objects, features and advantages are achieved by providing an improved clip nut having a flat elongated body which is bent about itself such that the end portions of the elongated body lie parallel to one another with one portion forming the top arm of the clip nut and the other portion forming the bottom arm of the clip nut, and the top arm having a hole through its surface and two small flanges projecting from the sides of the top arm, and the flanges each having a narrow elongated slot near its edge where the flange attaches to the top arm and having a nut which is composed of a flat plate having a tab on two opposite sides such that the tab fits into the elongated slots on the flanges holding the plate to the top arm, and also formed on the plate is an annular boss which is positioned around the hole extending through the plate, both the hole and the interior of the annular boss having a screw thread into which a bolt can be screwed, and the bottom arm having two fingers, one projecting from each side of the end of the bottom arm such that a plastic sleeve composed of three flat plates sandwiched together, the middle plate being of a smaller dimension than the top and bottom plate resulting in a groove along each side of the sleeve, can be slid onto the bottom arm which has two finger projections from its end such that the fingers fit into the grooves and an annular boss on the top plate of the plastic sleeve is located between the two arms of the clip nut, and when a plate or panel is inserted between the two arms of the clip nut, the annular boss on the plastic sleeve slides along the plate or panel and comes to rest in in a hole drilled in the plate at which point a bolt can be inserted through the hole in the plastic sleeve, the bottom arm, the panel and finally threaded into the nut on the top arm.

BRIEF DESCRIPTION OF THE DRAWING

The invention is best illustrated when taken in conjunction with the following drawing in which:

FIG. 1 is a side view of the preferred embodiment of the invention;

FIG. 2 is a bottom view of the invention illustrated in FIG. 1;

FIG. 3 is an end elevational view taken at line 3—3 of FIG. 1;

FIG. 4 is a partial view taken at line 4—4 of the invention illustrated in FIG. 1;

FIG. 5 is a partial view in section taken at line 5—5 of the invention illustrated in FIG. 1; and FIG. 6 is an isometric view of the invention as attached to a section of a panel.

The invention in this specification utilizes certain operative concepts or principles as set forth in the appended claims forming a part of this specification. Those skilled in the art to which this invention pertains will realize that these concepts or principles can be applied to a number of differently appearing clip nuts. For this reason the invention is not to be construed as being limited to the precise embodiment illustrated, but is to be construed in light of the claims.

DETAILED DESCRIPTION

Referring now to the figures, there is illustrated a clip nut 10 which is composed of a long flat strip of material 12 which is generally made of spring steel or an equivalent material. For certain applications the long flat strip 12 could also be formed of a suitable hard plastic-like material having spring-like properties. In any case the strip 12 is bent back upon itself essentially as illustrated such that one end of the strip 12 forms a bottom arm 14 and the opposite end forms a top arm 16. The remainder of the strip, intermittent bottom arm 14 and top arm 16 is bent as illustrated such that the bottom arm 14 and the top arm 16 are held in essentially paralleled relationship in respect to each other.

Along the side edges 18 and 20 of top arm 16 are two flanges 22 and 24 respectively. The flanges project from the top surface 26 of top arm 16 and each flange has an elongated slot 28 and 30 respectively which extend through the wall of the flange along the surface where the flange joins the top surface 26 of top arm 16. The end portion 32 of top arm 16 is bent up an oblique angle from top surface 26 to facilitate insertion of a panel or other similar plate between the top arm 16 and the bottom arm 14.

Resting on the top surface 26 of top arm 16 is a nut 34. Nut 34 is composed of a flat plate 36 having a tab 38 and 40 on opposite sides of the flat plate. The tabs 38 and 40 fit into slots 28 and 30 and hold the flat plate 36 against the top surface 26 of top arm 16. The flat plate 36 has a hole 42 through its surface and positioned around hole 42 is an upstanding annular boss 44. The interior surface of annular boss 44 and hole 42 are fitted with a screw thread to receive a bolt, as will be described later.

The tabs 38 and 40 are of a smaller dimension than slots 28 and 30. This allows nut 34 to move in respect to the top surface 26 of top arm 16. Passing through top arm 16 is a hole 46. The hole 46 is of a slightly larger dimension than hole 42 through nut 34. The combination of hole 46 being larger than hole 42 and the ability of nut 34 to move on top surface 26 allows for a small degree of positioning freedom and facilitates aligning nut 34 with a bolt with which the clip nut is secured.

The bottom arm 14 has two fingers 48 and 50 projecting from its end 52. These fingers 48 and 50 lie in the same plane as bottom arm 14, and on the tips of the fingers are dogs 54 and 56 respectively. The dogs 54 and 56 project toward the center of bottom arm 14. Bottom arm 14 also has a slot 58 punched through its surface.

A plastic sleeve 60 fits over bottom arm 14. Plastic sleeve 60 is molded as an integral one-piece unit; however, for the purposes of describing plastic sleeve 60 it can be considered to be composed of a top plate 62, a bottom plate 64 and an intermediate plate 66. Intermediate plate 66 is of smaller dimension than top and bottom plates 62 and 64, thus forming channels 68 and 70 respectively, along each edge channel. Intermediate plate 66 has, as depicted in FIG. 5, a small cutout portion on either side forming shoulders 72 and 74 on intermediate plate 66.

On the upper surface of top plate 62 is an annular boss 76 integrally formed with the remainder of the plastic sleeve 60. Passing through the center of the boss and through the main body of the plastic sleeve is a hole 78.

Plastic sleeve 60 is attached to the bottom arm 14 by sliding the sleeve on the arm such that fingers 48 and 50 fit into channels 68 and 70. The sleeve is slid along the fingers 48 and 50 until dogs 54 and 56 pass over and are retained by shoulders 72 and 74. This locks plastic sleeve 60 to bottom arm 14; however, since the length of intermediate plate 66 is less than the length of the fingers 48 and 50 as measured from the dogs 54 and 56 to end 52 of bottom arm 14, plastic sleeve 60 can slide back and forth between end 52 of bottom arm 14 and dogs 54 and 56. The sliding movement of plastic sleeve 60 further facilitates alignment when the bolt 80 is inserted into and through plastic sleeve 60 through panels such as panels 82 and 84 and finally into nut 34. The annular boss 76 on plastic sleeve 60 fits into a hole 86 drilled through panels 82 and 84 and holds the clip 10 in place prior to insertion of bolt 80.

When clip nut 10 is first slipped on panels 82 and 84, annular boss 76 slides against the surface of the channel and since all of plastic sleeve 60 including annular boss 76 is formed of a soft plastic-like material, annular boss 76 does not scratch or otherwise mar the surface of the panel in which it comes in contact with. Additionally when bolt 80 is tightened into nut 34, boss 76 will tend to be compressed and cold flow into the void between itself and hold 86 in the panel. This further retains clip nut 10 in position with respect to the panel and additionally provides for a degree of electrical isolation which minimizes galvanic corrosion of the panel.

I claim:

1. A clip nut of the type having a long, flat continuous body, said body bending back upon itself such that the two portions near the ends thereof lie essentially parallel to each other, one of said two portions forming the top arm of said clip nut the other of said two portions forming the bottom arm of said clip nut each of said arms having an inside surface and an outside surface, said inside surfaces directed toward each other, each of said arms having two side edges and an end edge, the improvement which comprises:
   said top arm having a hole near the end thereof,
   said top arm having a retaining means mounted on said outside surface of said top arm and positioned over said hole in said top arm;
   said bottom arm having a cut out portion near the end thereof, said cut out portion extending from the end edge of said bottom arm such that said bottom arm includes two fingers integrally formed with said arm, one finger extending parallel from each respective side of said arm, the outside edge of each said finger being continuous with the side edge of said arm;
   a plastic sleeve;
   said plastic sleeve having a hole;
   said plastic sleeve slidably mounted on said bottom arm about said fingers such that said plastic sleeve slides back and forth between said fingers aligning said hole in said plastic sleeve with said cut out portion in said bottom arm, said hole in said top arm and said retaining means.

2. The clip nut of claim 1 including said plastic sleeve having an annular boss integrally formed with and projecting from said sleeve toward said hole in said top arm, said boss positioned on said plastic sleeve around said hole in said plastic sleeve.

3. The clip nut of claim 2 wherein said plastic sleeve comprises an integrally molded structure having an upper plate, a lower plate, and an intermediate plate having at least one set of parallel sides, said intermediate plate being of smaller dimension than said upper and said lower plates;
   said intermediate plate separating said upper and said lower plates such that together said upper plate and said lower plate form the sides of and said set of parallel sides of said intermediate plate forms the bottom of a channel extending along each side edge of said plastic sleeve;
   said hole in said plastic sleeve extending through said lower plate, said intermediate plate and said upper plate;
   said boss projecting from said upper plate and positioned on said upper plate around said hole.

4. The clip nut of claim 3 wherein:
   each of said fingers includes a dog on the end thereof, said dogs lying in the plane of said lower arm and projecting toward the center of said arm.

5. The clip nut of claim 4 wherein:
   said fingers on said bottom arm fit into said channel on the sides of said plastic sleeve;
   said intermediate plate fitting into the area between said fingers;

said plastic sleeve being retained on said arm by said dogs abutting against said intermediate plate.

6. The clip nut of claim 1 wherein:

said retaining means comprises said upper arm having two flanges integrally formed with said side edges of said upper arm and projecting upwardly from said outside surface of said upper arm;

each of said flanges including an elongated slot in said flange;

a flat plate;

said flat plate having a tab projecting in the plane of said plate from two opposite sides;

a second annular boss integrally formed with said flat plate and extending from the top surface of said plate;

said flat plate having a hole extending through said flat plate;

the interior surface of said annular boss and said hole having a continuous interior screw thread;

said flat plate fitting on the outside surface of said top arm and said tabs fit into said slots retaining said plate on said top arm.

7. The clip nut of claim 1 wherein:

said plastic sleeve comprises an integrally molded structure having an upper plate, a lower plate, an intermediate plate having at least one set of parallel sides and an annular boss;

said intermediate plate being of smaller dimension than said upper and said lower plates;

said intermediate plate separating said upper plate from said lower plate such that together said upper plate and said lower plate form the sides of and said set of parallel sides of said intermediate plate forms the bottom of a channel extending along each side of said plastic sleeve;

said hole in said plastic sleeve extending through said lower plate, said intermediate plate and said upper plate;

said boss projecting from said upper plate and positioned on said upper plate around said hole;

each of said fingers including a dog in the end thereof;

said dog lying in the plate of said lower arm and projecting toward the center of said arm;

said finger on said bottom arm fitting into said channels on the sides of said plastic sleeve;

said intermediate plate fitting into the area between said fingers;

said plastic sleeve being retained on said arm by dogs abutting against said intermediate plate;

said retaining means includes a flat plate and said upper arm having two flanges integrally formed with said side edges of said upper arm and projecting upwardly from said outside surface of said upper arm;

each of said flanges including an elongated slot in said flange;

said flat plate having a tab projecting in the plane of said flat plate from two opposite sides;

a second annular boss integrally formed with said flat plate;

said flat plate having a hole extending through said flat plate; said second annular boss positioned around said hole in said flat plate;

the interior surface of said annular boss and said hole in said flat plate having a continuous interior screw thread;

said flat plate fitting on the outside surface of said top arm and said tabs fitting into said slots retaining said plate on said top arm.

* * * * *